June 21, 1966 K. SIEPMANN 3,257,506

CONTROLLED CONTRAST TELEVISION APPARATUS

Filed May 13, 1963 2 Sheets-Sheet 1

Jnventor:
Karl Siepmann
by Michael S. Striker
Attorney

CONTROLLED CONTRAST TELEVISION APPARATUS
Filed May 13, 1963 2 Sheets-Sheet 2
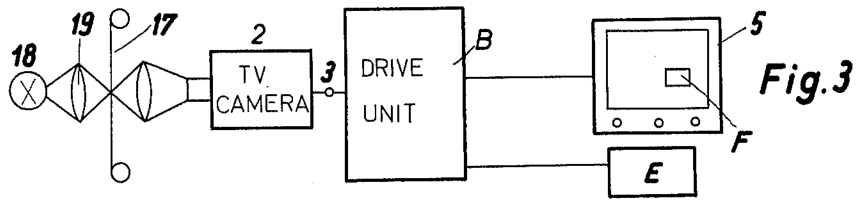
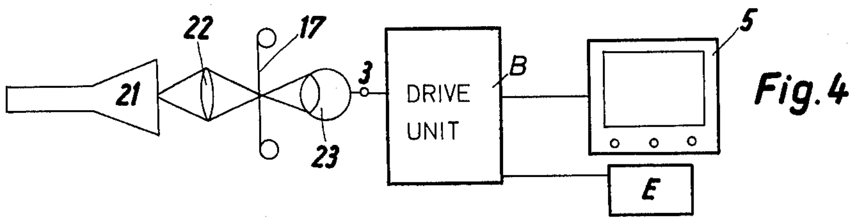
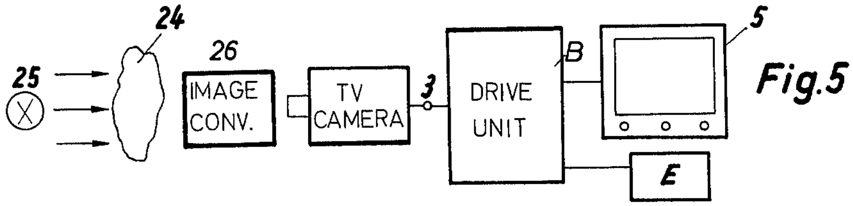
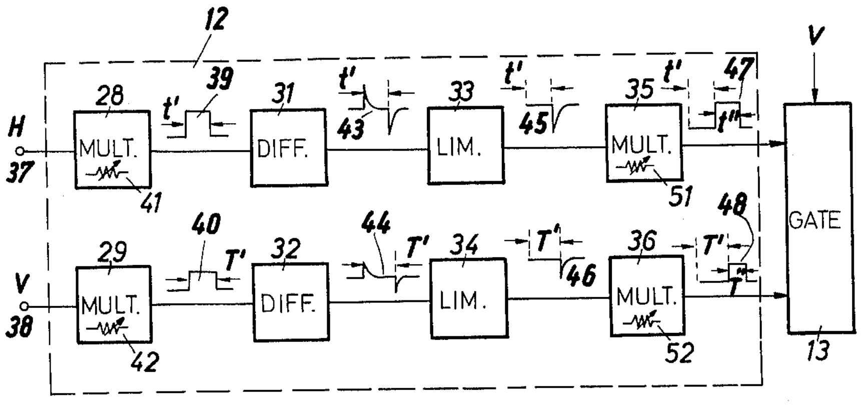
Fig.6
Jnventor:
Karl Siepmann
by Milford S. Stiker
Attorney United States Patent Office 3,257,506

Patented June 21, 1966

3,257,506

CONTROLLED CONTRAST TELEVISION APPARATUS

Karl Siepmann, Darmstadt, Germany, assignor to Fernseh G.m.b.H., Darmstadt, Germany Filed May 13, 1963, Ser. No. 279,878
Claims priority, application Germany, May 12, 1962, F 36,787
15 Claims. (Cl. 178—6.8)

Figure 1:
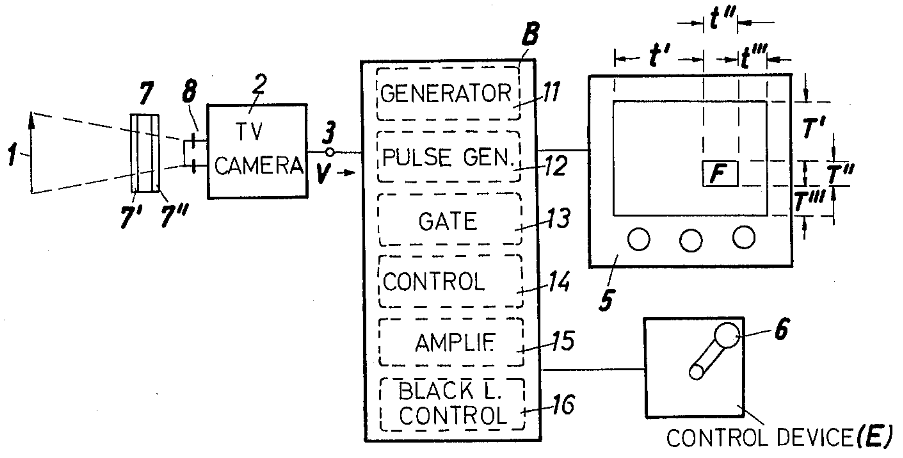

This invention relates to television apparatus for varying the detail contrast of a television picture. The invention may be employed both in the television studio and also in the field of industrial television.

In known apparatus the contrast of a television picture, that is, the amplitude range of the corresponding video signals, has been modified and in particular increased by deriving from the video signal a control voltage which was made use of to vary the illumination of the object or the sensitivity of the pickup tube in a television camera. Such alterations may be effected, for example, by adjustment of the diaphragm aperture, by the actuation of a device which controls the illumination of the object, or in those cases in which a pickup tube of the vidicon type is employed, by altering the voltage applied to the target electrode of the pickup tube. The control voltage derived from the video signal is naturally dependent upon the whole television picture. This known arrangement does not improve the reproduction of individual details of the picture, since these are not separately taken into account in deriving the control voltage.

Another known form of apparatus has for its purpose to increase the contrast of electrically transmitted pictures and in particular to increase the contrast of electrically transmitted X-ray pictures. In this known arrangement the gain of an amplifier stage is adjusted so that the contrast of a selected section of the picture is improved. This known circuit arrangement makes possible an increase of contrast only when the video signal from which the control voltage is derived exhibits a certain variation. In many cases, however, the variations of the video signal are so small that the improvement of contrast which can be produced by this means is either small or negligible. As is known, objects to be transmitted by television are not in all cases suitably lit. This may result in an inadequate television picture, since an arbitrarily illuminated object may for example be unsuitably illuminated, or since an object to be picked up by television may not be able to be properly illuminated (e.g., a self-luminous object), or because the contrast of an object to be picked up by television may be greater than that which the television pickup tube can usefully accept.

Thus for example, if a part of the object is illuminated extremely brightly, then the level of the corresponding video signals reaches approximately the white level. The level of this video signal then becomes substantially constant, since under these conditions the pickup tube is over-modulated. It is true that the level of this video signal may be reduced by an alteration of gain, so as to correspond to some grey level, but the corresponding portion of the picture shows just as little detail as before even after the alteration of gain.

In particular, this known circuit arrangement does not permit any improvement in the detail contrast when the contrast of the object picked up substantially exceeds that with which the pickup tube can work. For example, the dark parts of the object appear as grey or black areas lacking in detail on the screen of a television receiver while the bright parts are reproduced in full contrast, or the dark parts of the picture may be reproduced in full contrast while the white portions do not show any detail.

In another known circuit arrangement the detail contrast of a picture, corresponding to a photographic X-ray negative, is increased by illuminating his X-ray negative by using a flying-spot scanner with a relatively coarse spot, and using a television camera to derive signals from the thus-illuminated negative. The video signal thus derived is fed to a monitor receiver on the screen of which it is made visible to an observer. In addition a control voltage is derived in accordance with the transmission or reflectance of the instantaneously illuminated portion of the negative (for example by the use of a photocell) and this control signal is used to control the beam current of the scanning tube of the flying-spot scanner so as to improve the detail contrast in the reproduced picture. Optically dense portions of the negative are thus more brightly illuminated than optically more transparent details of the X-ray negative. This way of increasing the detail contrast has the disadvantage that it can only be carried out by using a flying-spot scanner. A further disadvantage is that the shape of the area which determines the value of the control signal is given by the circular form of the scanning spot of the scanner tube. In addition, it is not possible to make the size of this circular spot of any desired size, as otherwise the control voltage would be falsified at the edges of the X-ray negative.

It is an object of the present invention to provide a circuit arrangement in which the disadvantages of the known circuit arrangements may be wholly or in part avoided.

It is a further object of the present invention to provide a television apparatus for increasing the detail contrast of television pictures.

It is a still further object of the present invention to provide a television apparatus for increasing the detail contrast of X-ray pictures.

It is another object of the present invention to increase the detail contrast of a selected area of the television picture.

According to the present invention there is provided television apparatus for varying the detail contrast of a television picture derived by scanning an object, in which the video signal derived by scanning said object is applied to a gate circuit controlled by signals such that it allows to pass only those components of said video signal which correspond to a predetermined portion of said picture and in which those video signal components which pass through said gate circuit are applied to means which derive therefrom a control voltage which is employed to vary the conditions under which said video signal is generated.

In one embodiment of apparatus according to the invention the control voltage derived from the selected video signal components is applied to vary the amount of light passing from the scanned object to a pickup device by which said video signal is generated.

In another embodiment of apparatus according to the invention the selected video signal components yield a control voltage which is applied to vary the conditions of operation within a television pickup tube used to generate said video signal. Thus when a vidicon pickup tube is employed the control voltage may be applied to vary the direct voltage applied to the target electrode of the vidicon.

In comparison with known arrangements in which there is derived a control voltage dependent upon the whole of the video signal, and in which this control voltage is used to vary the amount of light passing from the object to a television pickup tube, apparatus according to the invention provides the advantage that the conditions as regards individual details of the picture may be specially taken into account by appropriate selection of the area from which the control voltage is derived, and the detail contrast correspondingly improved.

In comparison with other known circuit arrangements in which the gain of the video signal components is altered and the contrast of the corresponding portions of the picture increased, the circuit arrangement according to the invention has the advantage that even when the variations of amplitude of the initial video signal are very small, improved detail contrast is often obtainable by improving the conditions under which the video signal is generated by the use of the invention. This is because the pickup conditions as regards illumination of the object and sensitivity of the pickup tube may be adjusted so that the pickup tube is not overmodulated.

In particular the circuit arrangement according to the invention makes it possible to obtain improved detail contrast even when the contrast of the object being picked up substantially exceeds the contrast which can be accepted by the pickup tube. By employing the invention dark parts of the object are scanned under conditions of minimum reduction of illumination or of maximum sensitivity of the pickup tube, whereas bright parts of the object are scanned under conditions of maximum reduction of illumination or of minimum sensitivity of the pickup tube.

As compared with other known circuit arrangements in which an X-ray negative is illuminated by the use of a flying spot scanner with a relatively coarse scanning pattern, the circuit arrangement according to the invention has the advantage that not only flying-spot scanners but television cameras also may be used as the source of the video signal.

The control voltage derived in accordance with the invention may be employed in a number of different ways. In a first case the control voltage effects alterations of the conditions of operation of the means used to generate the video signal only during the scanning of those portions of the picture area which correspond to the portions of the video signal from which the control voltage is derived. In this first case the picture reproduction outside the selected portion of the picture is not affected. The employment of this aspect of the invention is particularly advantageous when the portion of the picture within the selected area is to be especially emphasized and the relations of the portions of the picture within and without the selected area are to be recognisable. It may be found advantageous in some cases to indicate the area of the picture on which the control voltage is operative, for example, by mixing-in with the video signal pulse trains such as to yield a black or a white margin to the selected portion of the picture.

In a second mode of operation of a circuit arrangement according to the invention, the control voltage which is derived from video signal components corresponsing to a predetermined area only of the picture is employed to alter the amount of light passing from the object to the pickup tube, or to alter the internal conditions of operation of the pickup tube throughout the whole scanning operation. In this second mode of operation any other portions of the picture, the video signal components corresponding to which are similar to the video signal components corresponding to the selected area will likewise be emphasized. Thus for example, if an X-ray picture representing a bone is being reproduced by television, then it is usually advantageous for the whole bone to be emphasized with respect to the remaining portions of the picture. If the remaining picture background proves disturbing, then the corresponding video signal components may be clipped by a limiter (e.g. a peak-white limiter). It may then possibly be advantageous to designate any area from which the video signal components are used to derive the control signal by mixing-in to the television picture a white or black edging.

In a third mode of operation, the control voltage derived from the video signal components corresponding to a selected picture area is made use of only to modify those components of the video signal which relate to this selected area, while the picture reproduction outside this selected area is completely indepedent of the original video signal. Thus for example the picture outside the selected area may be white, gray, black or even coloured, so that the picture within the area, is especially clearly emphasized and disturbing portions of the picture outside this area are suppressed.

In all the three modes of operation described it may be advantageous for it to be possible to shift the predetermined area, from the video signal component corresponding to which the control voltage is derived, to any desired part of the picture area by the operation of an appropriate control device. In this manner it is possible with relatively little additional technical expense to select immediately any part of the picture of which the detail contrast is to be improved.

Figure 2:
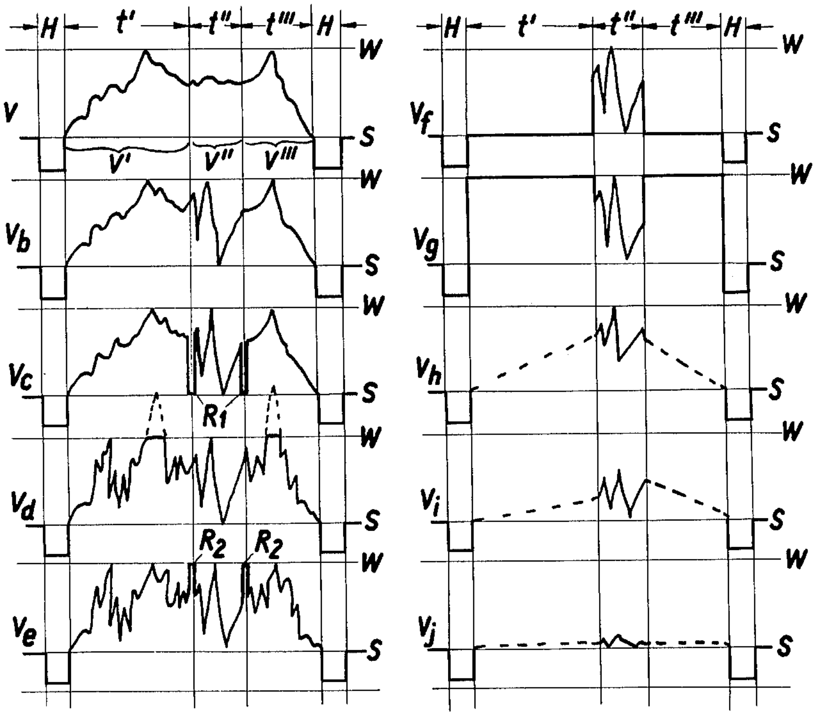

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIGURE 1 shows a circuit arrangement according to the invention for modifying the detail contrast of a picture made visible on the screen of a television receiver, FIGURE 2 consists of a number of waveform diagrams, illustrating different modes of operation in accordance with the invention, FIGURE 3 shows a circuit arrangement for modifying the detail contrast of a video signal derived by scanning a film by means of a television camera, FIGURE 4 shows a circuit arrangement for modifying a video signal which is derived by scanning a film by the flying-spot method, FIGURE 5 shows an arrangement for the television display of an X-ray picture, FIGURE 6 shows a gating stage such as is employed in the arrangement shown in FIGURE 1 and in FIGURES 3 to 5.

In all these drawings corresponding elements are designated by the same reference numerals.

In FIGURE 1 an object is viewed by a television camera 2 and the video signal V developed by the camera is applied by way of point 3 in the circuit to a drive unit B which is connected on the one hand with a television monitor 5 and on the other hand with a control device E. To vary the amount of light passing from the object through the objective lens of the television camera 2 there is provided a variable density filter 7, consisting essentially of two plane-parallel transparent plates 7′ and 7″ disposed perpendicular to the optical axis and so arranged that the separation between them may be varied in response to a controlling voltage. The space between the transparent plates is filled with a light-absorbing liquid, so that the amount of light absorbed increases as the separation of the plates is increased. Alternatively, however, the amount of light passing through the camera lens may be varied by changing the setting of the iris diaphragm 8.

Within the drive unit B are contained a generator 11, a pulse generator 12, a gate circuit 13, a control stage 14, an amplifier 15 and a black level control stage 16. The generator 11 produces all the operating voltages necessary for the whole equipment.

Let it be assumed that each horizontal scanning period may be divided into three successive portions $t'$, $t''$ and $t'''$, of which portion $t''$ is that occupied in scanning a predetermined area of the picture. In a similar manner, the vertical scanning period may be regarded as divided into three portions $T'$, $T''$, $T'''$, of which period $T''$ is that during which the scanning electron beam can encounter the predetermined area.

then be applied to modify the brightness of the light source 18 in such a manner as to vary in a required manner the amount of light passing from the object (film 17) into the television camera 2.

In FIGURE 4 a film 17 is scanned by the flying-spot method, a scanning raster being produced on the screen of a scanner tube 21 and imaged by means of a lens 22 upon the film 17, light passing through which falls upon a photocell 23 to yield the video signal. In this case the control voltage may be applied to vary the beam current in the scanner tube 21 in such a manner as to produce required alterations in the amount of light passing from film 17 into photocell 23.

In FIGURE 5 a body 24 is irradiated by means of an X-ray source 25 and the radiation penetrating the body is converted into a visible image in known manner by the use of an X-ray image converter 26. The visible image thus produced is viewed by a television camera 2 which yield the required video signal. In an arrangement such as this, pictures of very low contrast are to be expected, so that the improvement of the detail contrast obtained by the use of the invention is particularly important.

FIGURE 6 shows details of the pulse generator 12 of FIGURE 1. This consists of two monostable multivibrators 28, 29 two differentiating stages 31, 32, two amplitude limiters 33, 34 and two further monostable multivibrators 35, 36. By way of terminals 37 and 38 horizontal frequency and vertical frequency pulses respectively are applied to the multivibrators 28 and 29 which are thus triggered to generate respectively horizontal frequency and vertical frequency pulses 39 and 40. The durations of these pulses 39 and 40 ($t'$ and $T'$ respectively) are dependent in each case upon the duration of the quasi-stable condition of the appropriate multivibrator and may be varied by appropriate adjustment of the time-constant element 41 or 42 in that multivibrator. From these rectangular pulses 39 and 40 there are derived by differentiation in stages 31, 32 the brief pulses 43, 44 respectively and from these by limiting in stages 33, 34 the pulses 45 and 46 respectively. The leading edges of pulses 45 and 46 are timed by the trailing edges of the rectangular pulses 39 and 40 respectively, so that the timing of the pulses 45 and 46 may be varied by adjustment of the time-constant elements 41 and 42. Since these pulses 45 and 46 are used to synchronize the multivibrators 35 and 36 respectively, the rectangular pulses 47 and 48 produced respectively by these multivibrators may be timed to occur anywhere in the interval between two successive horizontal or vertical blanking pulses respectively.

It is also possible to adjust the durations of the pulses 47 and 48 ($t''$ and $T''$ respectively) by means of time-constant members 51 and 52, so that the lengths of the sides of the predetermined area F may thus be optionally adjusted. These pulses 47 and 48 are applied to the gate 13 and thus cause it to be operated so that only components of the video signal V appearing during the periods $t''$ and $T''$ are allowed to pass through the gate and thus to become effective in producing said control voltage.

While the invention has been illustrated and described as embodied in an arrangement for modifying the detail contrast of a picture made visible on the screen of a television receiver it is not intended to be limited to the details shown, since various modifications and structural changes may be made without departing in any way from the spirit of the present invention.

What is claimed as new and desired to be secured by Letters Patent is:

1. Television apparatus for varying the detail contrast of a television picture, comprising, in combination, a pickup device scanning an object and deriving a video signal; a television receiver displaying said video signal; a gate circuit passing only those components of said video signal which correspond to a predetermined area of said picture; a control stage deriving a control voltage depending upon the level of signals applied to its input lead; connection means applying said components of said video signal to said input lead of said control stage; means for altering the conditions under which said video signal is generated being controllable by said control voltage; and connection means applying said control voltage to said means for altering the conditions under which said video signal is generated.

2. Means for altering the conditions under which said video signal is generated according to claim 1, comprising a device varying the amount of light passing from said object to said pickup device and being controllable by said control voltage.

3. Television apparatus for varying the detail contrast of a television picture, comprising, in combination a pick-up device scanning an object with controllable sensitivity and deriving a video signal; a television receiver displaying said video signal; a gate circuit passing only those components of said video signal which correspond to a predetermined area of said picture; a control stage deriving a control voltage depending upon the level of signals applied to its input lead; connection means applying said components of said video signal to said input lead of said control stage; connection means applying said control voltage to said pickup device and controlling its sensitivity.

4. Control stage according to claim 1, comprising a rectifier deriving said control voltage by rectification of said components of said video signal.

5. Control stage according to claim 1, comprising in combination an amplitude limiter passing only those portions of signals applied to its input lead which exceed a predetermined level; connection means applying said components of said video signal to said input lead of said limiter; a rectifier rectifying signals applied to its input lead; connection means connecting the output lead of said limiter with said input lead of said rectifier; connection means applying the output lead of said rectifier with said means for altering the conditions under which said video signal is generated.

6. Means for altering the conditions under which said video signal is generated according to claim 1, comprising a variable density optical filter being arranged in the optical path from said object to said pickup device and consisting of two plane-parallel transparent plates disposed perpendicular to the axis of said optical path, the space between said plates being filled by a light-absorbing liquid and the separation of said plates being arranged to be variable under the control of said control voltage.

7. Television apparatus according to claim 1, comprising a vidicon pickup tube within said pickup device; connection means applying said control voltage to the target electrode of said pickup tube.

8. Television apparatus according to claim 1, comprising an illumination device illuminating said object and being controllable by said control voltage in order to vary the illumination of said object.

9. Television apparatus for varying the detail contrast of a television picture, comprising in combination a flying spot scanner with a cathode ray tube scanning an object and deriving a video signal; a television receiver displaying said video signal; a gate circuit passing only those components of said video signal which correspond to a predetermined area of said picture; a control stage deriving a control voltage depending upon the level of signals applied to its input lead; connection means applying said components of said video signal to said input lead of said control stage; connection means applying said control voltage to an electrode of said cathode ray tube and varying its beam current.

10. Television apparatus for varying the detail contrast of a television picture, comprising in combination, a pickup device scanning an object and deriving a video signal; a gate circuit passing only those components of said video signal which correspond to a predetermined The circuit arrangement illustrated in FIGURE 1 is particularly suitable for improving the detail contrast of the picture within the predetermined area. For this purpose the gate circuit 13 is made use of to suppress those portions of the picture signal occurring during time intervals $t'$, $t'''$, $T'$ and $T'''$ and thus relating to portions of the picture lying outside the predetermined area. From the output signal of the gate circuit 13, which thus contains only signal components corresponding to the scanning of the predetermined area F, there is derived in known manner by the use of a control stage 14 a control voltage of which the value is dependent upon the mean level of these video signal components. The control voltage thus derived is made use of to improve the detail contrast of the portion of the picture lying within the predetermined area F by applying it to vary the amount of light passing from the object to the camera tube in the television camera 2.

It is preferably possible to adjust the position of the predetermined area F within the picture area to any required position by means of a control device E, which may be provided with a joy-stick type of control member 6. In addition the shape of the area F and/or its size is preferably made adjustable at will. In order to carry out such adjustments the pulse generator 12 contains means for producing gate control pulses of adjustable timing and duration.

FIGURE 2 illustrates various modes of operation of a circuit arrangement according to the invention by waveform diagrams illustrating a single line only of the picture, extending between two successive horizontal blanking intervals H. This video signal V consists of successive video signal components $V'$, $V''$ and $V'''$ and occupies the amplitude range between the black level S and the white level W. The amplitude of the component $V''$ of this video signal varies comparatively little. If this is the case for all scanning lines which intersect the predetermined area, then if no action is taken to improve the detail contrast of this portion of the picture there will be little or no detail recognisable within the area F (FIGURE 1) of the picture. In order to prevent this in accordance with the present invention, at least one control voltage is derived from the video signal component $V''$ and applied to vary the conditions under which this component is derived.

The picture reproduction during the intervals $t'$, $t'''$, $T'$ and $T'''$ may be treated in a number of different ways. In a first mode of operation the video signal components $V'$ and $V'''$ remain unaltered, as shown by waveform $V_b$ in FIGURE 2. In this case the area F may be denoted by a black marginal line produced by injecting black-level pulses $R_1$ into the picture signal at the transitions between periods $t'$ and $t''$ and between periods $t''$ and $t'''$, as shown in waveform $V_c$ of FIGURE 2.

In a second mode of operation the control voltage derived from the gated video signal is applied to modify the whole video signal V, so that there results the video signal illustrated by waveform $V_d$ of FIGURE 2. Here again the extent of the predetermined area from which the control voltage is derived may be denoted by a marginal line, which in this case is produced by rectangular impulses of peak-white amplitude injected into the picture signal as shown at $R_2$. If the action of the control voltage is such as to cause the amplitude of the video signal to exceed the nominal range, then it is assumed that at least those portions of the signal which correspond to a "blacker than black" value are clipped off, in order to avoid any disturbance of the synchronization.

In a third mode of operation the video signal components $V'$ and $V'''$ are replaced by other signals, for example by a black-level signal, when the selected picture area appears against a black background, as illustrated by waveform $V_f$, or by a white-level signal as illustrated by waveform $V_g$, when the selected portion of the picture is surrounded by a white ground.

Starting from an initial video signal V, the signal component $V''$ may thus be modified so that its maximum amplitude corresponds to the peak white level W, as shown by the waveform $V_b$, $V_c$, $V_d$, $V_f$ and $V_g$ of FIGURE 2. This modification of the video signal may be effected by an alteration of the amount of light passing from the object into the camera and/or an alteration in the amplification of the video signal. Specifically, the control voltage may be derived from the video signal components applied by way of gate circuit 13 to control voltage generating stage 14 by means of a peak rectifier which responds to the amplitude of the video signal component $V''$ and this control voltage may be applied to effect the appropriate alteration of the signal gain or of the optical path. In many cases, however, it is advantageous to effect at the same time a black-level control of the video signal by clamping it at the level corresponding to the darkest picture point, so that the minimum amplitude of the video signal component $V''$ is held at the black level, as shown in the waveform $V_b$ to $V_g$ of FIGURE 2.

In many cases, however, it is sufficient for the video signal component $V''$ to be modified by an alteration of the amount of light passing to the camera and/or an alteration of the gain in the video signal channel so as to yield signals as illustrated by waveforms $V_h$ and $V_i$ of FIGURE 2.

In other cases again it is necessary to alter only the direct-current component of the video signal component $V''$, yielding for example the signal illustrated by waveform $V_j$ of FIGURE 2. In waveforms $V_h$, $V_i$ and $V_j$ the signal components corresponding to intervals $t'$, $t'''$, $T'$ and $T'''$ are not particularly considered and are therefore illustrated only by broken lines.

The control voltage which is made use of to modify the conditions under which the video signal is derived may be derived in known manner by rectifying the video signal component $V''$, thus obtaining a control voltage dependent upon the means value of the video signal component. Alternatively, however, the control voltage may be derived in another known manner by applying the video signal component $V''$ to an amplitude limiter which passes only those portions of an applied signal which exceed a predetermined level and then rectifying the signal peaks passed by the limiter in a rectifier, thus obtaining a control voltage proportional to the mean value of these signal peaks. By means of a control voltage derived in this manner the amount of light passing from the object into the television camera may be varied by the use of a variable-density optical filter such as the device 7 described in relation to FIGURE 1, and/or by using an iris diaphragm. If the video signal is derived by means of a television camera employing a pickup tube of the vidicon type, then the sensitivity of the pickup tube itself may be modified in accordance with the value of the control voltage by using this to vary the bias voltage applied to the target electrode of the pickup tube.

FIGURES 3 to 6 represent various arrangements incorporating the present invention, in which a video signal V applied by way of point 3 in the circuit to a drive unit B is displayed after appropriate modifictaion on the screen of a picture monitor 5, a control device E being used to determine the size and position of the predetermined picture area from which the control voltage is derived.

In FIGURE 3 the video signal is derived by scanning a cinematographic film 17, which is illuminated by a light source 18 by way of a lens system 19. An image of the film is thus projected into a television camera 2. The improvement of the detail contrast obtained by the use of the present invention is especially important when the film 17 is of low contrast, as is often the case for example with X-ray film. The circuit arrangement according to the invention may thus be used with particular advantage for improving the recognition of bones, tissues, organs and the like. The derived control voltage may area of said picture; a control stage deriving a control voltage depending upon the level of signals applied to its input lead; connection means applying said components of said video signal to said input lead of said control stage; means for altering the conditions under which said video signal is generated being controllable by said control voltage; connection means applying said control voltage to said means for altering the conditions under which said video signal is generated; a generator generating rectangular pulses of which the amplitude corresponds with the black or with the white level of said video signal and of which the timing is such that there appears in said picture reproduced from said video signal a black or a white line respectively following the boundary of said predetermined area; a mixer mixing said video signal with said rectangular pulses; a television receiver; connection means applying the mixed output signal of said mixer to said television receiver.

11. Television apparatus for varying the detail contrast of a television picture, comprising, in combination, a pickup device scanning an object and deriving a video signal; pulse generators generating trains of horizontal-frequency and vertical-frequency pulses; a gate circuit passing only those components of signals applied to its input lead which coincide with said trains of horizontal-frequency and vertical-frequency pulses; connection means applying said video signal to said input lead of said gate circuit passing only those components of said video signal which correspond to a predetermined area of said picture; a control stage deriving a control voltage depending upon the level of signals applied to its input lead; connection means applying said components of said video signal to said input lead of said control stage; means for altering the conditions under which said video signal is generated being controllable by said control voltage; connection means applying said control voltage to said means for altering the conditions under which said video signal is generated.

12. Pulse generator according to claim 11, generating trains of horizontal-frequency and vertical-frequency pulses whereby the timing and the duration of each said train of pulses is arranged to be variable.

13. Television apparatus for varying the detail contrast of a television picture, comprising, in combination, a pickup device scanning an object and deriving a video signal; an amplifier amplifying said video signal; a television receiver displaying said amplified video signal; a gate circuit passing only those components of said amplified video signal which correspond to a predetermined area of said picture; a peak rectifier yielding a control voltage dependent upon the peak value of signals applied to its input lead; connection means applying said components of said video signal to said input lead of said peak rectifier; connection means applying said control voltage to said amplifier amplifying the maximum value of said video signal components approximately to the the nominal peak white level.

14. Television apparatus for varying the detail contrast of a television picture, comprising, in combination, a pickup device scanning an object and deriving a video signal; a television receiver displaying said video signal; a gate circuit passing only those components of said video signal which correspond to a predetermined area of said picture; a peak rectifier deriving a control voltage depending upon the peaks in said components of said video signal corresponding to the darkest portions of said predetermined area; a clamping circuit being controlled by said control voltage and controlling the black level of said video signal.

15. Television apparatus for varying the detail contrast of a television picture, comprising, in combination, a pickup device scanning an object and deriving a video signal; a television receiver displaying said video signal; a plurality of gate circuits each passing only video signal components which correspond to individual exclusive areas of said picture; a plurality of control stages corresponding to said gate circuits and deriving control voltages each depending upon the level of signals applied to its input leads respectively; connection means applying said components of said video signal to said input leads respectively of said control stages; means for altering the conditions under which said video signal is generated being controllable by said control voltages; connection means applying said control voltages to said means for altering the conditions under which said video signal is generated.

References Cited by the Examiner

UNITED STATES PATENTS

| | | | |
|---|---|---|---|
| 2,417,506 | 3/1947 | Lamb | 178—7.1 |
| 2,451,640 | 10/1948 | Thalner | 178—7.2 |

FOREIGN PATENTS

| | | |
|---|---|---|
| 830,083 | 3/1960 | Great Britain. |

DAVID G. REDINBAUGH, *Primary Examiner.*

R. L. RICHARDSON, *Assistant Examiner.*